United States Patent [19]

Gabelli

[11] Patent Number: 4,765,756
[45] Date of Patent: Aug. 23, 1988

[54] ROLLING BEARING

[75] Inventor: Antonio Gabelli, Ijsselstein, Netherlands

[73] Assignee: SKF Industrial Trading and Development Co., B.V., Nieuwegein, Netherlands

[21] Appl. No.: 39,465

[22] Filed: Apr. 16, 1987

[30] Foreign Application Priority Data

Apr. 22, 1986 [NL] Netherlands ............ 8601030

[51] Int. Cl.⁴ ............ F16C 33/74; F16C 33/82; F16J 15/40
[52] U.S. Cl. ................ 384/133; 277/80; 384/446; 384/484
[58] Field of Search .............. 384/130–133, 384/143, 145–148, 445, 446, 448, 462, 470, 477, 478, 481–484, 486, 488, 490, 624; 277/80

[56] References Cited

U.S. PATENT DOCUMENTS

| 4,039,231 | 8/1977 | DiLoreto | 384/516 |
| 4,043,616 | 8/1977 | Zimmer | 384/133 |
| 4,077,508 | 3/1978 | Pedersen | 384/446 X |
| 4,171,818 | 10/1979 | Moskowitz et al. | 277/80 |
| 4,502,739 | 3/1985 | Flander | 384/484 X |
| 4,531,846 | 7/1985 | Raj | 384/478 |

FOREIGN PATENT DOCUMENTS

| 2251466 | 5/1973 | Fed. Rep. of Germany | 384/462 |
| 205018 | 10/1985 | Japan | 384/477 |

Primary Examiner—John Petrakes
Assistant Examiner—Thomas R. Hannon
Attorney, Agent, or Firm—Rosen, Dainow & Jacobs

[57] ABSTRACT

A rolling bearing comprising an outer race and an inner race situated coaxially therein both races defining an annular space therebetween and a row of rolling members in the annular space between the races, and generally annular ring seals, having inwardly directed sides and inner and outer peripheral areas, for sealing off from the surroundings, on either side of the rolling members, the annular space between the races wherein a lubricant is present, wherein the inwardly directed sides of the sealing rings is formed with at least one cavity containing a fluid magnetic lubricant, and a magnetic forming magnetic fields, the poles of which fields are located on either side of the cavity, near the races.

4 Claims, 1 Drawing Sheet

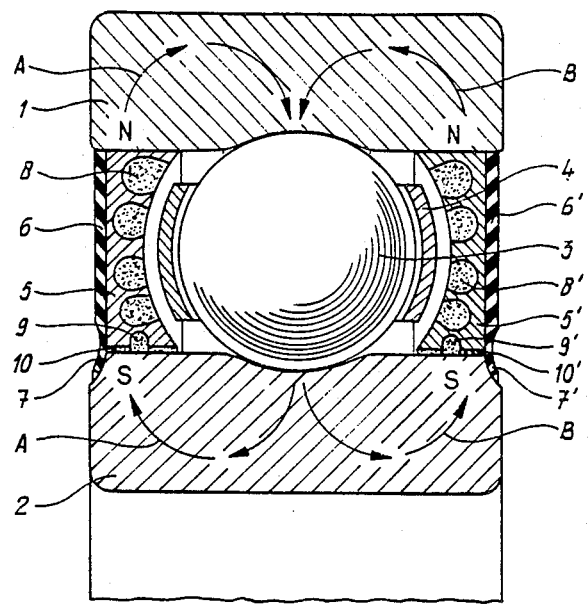

ROLLING BEARING

The invention concerns a rolling bearing comprising at least one outer race and at least one inner race situated coaxially therein and at least one row of rolling members situated in the annular space between the races, and generally annular seals for sealing off from the surroundings, on either side of the rolling members, the annular space between the races wherein a lubricant is present. Such a rolling bearing is generally known.

In rolling bearings of this type a grease is often used as lubricant, where the violent movements to which such grease, between the rolling members, is subjected produce heat of friction with, as a result, an increase of the temperature within the bearing, owing to which the lubricant ages more rapidly and becomes oxidized. In addition, these violent movements of the lubricant affect the structure of the grease, owing to which the grease rapidly grows soft and may ultimately break down entirely between the parts to be lubricated, owing to which the temperature within the bearing become still higher.

The solution to this problem has hitherto been sought in a limitation of the quantity of lubricant, but a smaller quantity of grease may result in lubricant failure and an increase in the content of metal particles worn off into the grease.

The object of the invention is to procure an improved bearing of the type mentioned wherein the abovementioned problems are solved in another effective way.

This object is accomplished in that in the rolling bearing pursuant to the invention, in the inwardly directed sides of the sealing rings there is formed at least one cavity containing a fluid magnetic lubricant, while means forming magnetic fields are present, the poles of which fields are located on either side of the cavity, near the races.

In a rolling bearing designed in this way each cavity forms a lubricant reservoir wherein, owing to the magnetic fields, a lubricant in the form of a magnetic fluid is confined, while at the same time these magnetic fields ensure that the proper quantity of lubricant is always found between the contacting parts of the rolling members and the races. An exchange of the quantity of active lubricant from a reservoir is obtained by the continuous evaporation and condensation of the lubricant, so that in the course of time the total quantity of lubricant within a reservoir will be consumed.

Further, an additional advantage is that any metal particles worn off would be retained within the cavities by the magnetic fields, so that such particles are unable to enter the sensitive contact areas.

The sealing rings are preferably designed as magnets forming the magnetic fields, of which one pole is situated in the inner peripheral area and the other pole in the outer peripheral area.

A sealing member having a sealing lip is advantageously attached to at least one of the sealing rings, and behind said lip, between the sealing ring and the facing race, there is present a quantity of sealing magnetic fluid.

A magnetic fluid is known per se and consists of a colloidal suspension of extremely small particles, in the order of magnitude of 7–10 $\mu$m, of a material having a paramagnetic properties, usually magnetized, in a fluid consisting mostly of a hydrocarbon, these particles being clad with a thin layer of a material that prevents flocculation of the particles. The particles normally move constantly in the fluid as a result of thermal agitation and Brownian movement, but when such a magnetic fluid is located in a magnetic field the particles orient themselves in essentially one direction, whereby the fluid acts like soft iron.

It is noted further that U.S. Pat. No. 4,043,612 discloses that a magnetic lubricant may be used in a bearing design where such lubricant is placed under pressure during rotation by a pumping action obtained by means of grooves, and such lubricant, upon standstill of the bearing, is held within the bearing by means of a magnetic field.

The invention is explained in detail with the aid of the drawing, wherein a portion of the rolling bearing pursuant to the invention is shown in axial cross section.

As shown in the drawing, the rolling bearing comprises an outer race 1 and an inner race 2 situated coaxially therein, and a row of rolling members 3 situated between the races 1 and 2, which are kept apart by the cage 4.

The annular space between the races 1 and 2 is sealed off on either side of the rolling members 3 by the sealing rings 5, 5' and the seals 6, 6', of an elastomeric material, attached thereto, which comprise the sealing lips 7, 7' that rest springily against the inner race 2.

The sealing rings 6, 6' are designed as magnets with the north and south poles illustrated, so that magnetic fields are formed, the lines of force of which are indicated by A and B.

In the inwardly directed sides of the sealing rings 5, 5' is formed a plurality of cavities 8, 8' wherein a lubricant in the form of a magnetic fluid is confined by the magnetic fields A, B.

In addition, in the inner peripheral areas, directed toward the race 2, of the sealing rings 5, 5' are formed cavities 9, 9', while in the slot between the sealing rings 5, 5' and the race 2 a quantity of sealing magnetic fluid 10, 10' is present.

I claim:

1. A rolling bearing comprising at least one outer race and at least one inner race situated coaxially therein both races defining an annular space therebetween and at least one row of rolling members situated in the annular space between the races, and generally annular ring seals, having inwardly directed sides and inner and outer peripheral areas, for sealing off from the surroundings, on either side of the rolling members, the annular space between the races wherein a lubricant is present, wherein the inwardly directed sides of the sealing rings being formed with at least one cavity containing a fluid magnetic lubricant, and magnetic means forming magnetic fields, the poles of which fields are located on either side of said at least one cavity, near the races.

2. A rolling bearing according to claim 1, wherein the sealing rings are designed as magnets forming the magnetic fields, of which one pole is situated in the inner peripheral area and the other pole in the outer peripheral area.

3. A rolling bearings according to claim 1 or 2, wherein at least one of the sealing rings has attached a sealing member having a sealing lip and behind said lip, between the sealing ring and the race which faces said lip, there is present a quantity of sealing magnetic fluid.

4. A rolling bearing according to claim 1, further including a plurality of cavities containing a fluid magnetic lubricant are formed in the inwardly directed sides of the sealing rings.

* * * * *

UNITED STATES PATENT AND TRADEMARK OFFICE
CERTIFICATE OF CORRECTION

PATENT NO. : 4,765,756

DATED : August 23, 1988

INVENTOR(S) : Antonio Gabelli

It is certified that error appears in the above-identified patent and that said Letters Patent is hereby corrected as shown below:

Title page:

In the Abstract line 12, before "forming" insert --elements--.

Signed and Sealed this

Tenth Day of July, 1990

Attest:

HARRY F. MANBECK, JR.

*Attesting Officer*   Commissioner of Patents and Trademarks